United States Patent [19]

Grotyohann et al.

[11] Patent Number: 4,457,899

[45] Date of Patent: Jul. 3, 1984

[54] PROCESS FOR REMOVAL OF RESIDUAL ORGANIC MATTER FROM PURIFIED PHOSPHORIC ACID

[75] Inventors: Richard G. Grotyohann, Somerset; Byron E. Johnston, Skillman, both of New Jersey; Robin Schlinger, Lakeland, Fla.

[73] Assignee: Mobil Oil Corporation, New York, N.Y.

[21] Appl. No.: 490,917

[22] Filed: May 2, 1983

Related U.S. Application Data

[63] Continuation-in-part of Ser. No. 323,517, Nov. 23, 1981, abandoned.

[51] Int. Cl.$^3$ .............................................. C01B 25/16
[52] U.S. Cl. .............................. 423/321 S; 423/321 R
[58] Field of Search ................. 423/321 R, 321 S, 320

[56] References Cited

U.S. PATENT DOCUMENTS

| | | | |
|---|---|---|---|
| 3,297,401 | 1/1967 | Sakomure et al. | 23/165 |
| 3,410,656 | 11/1968 | Bumin et al. | 23/165 |
| 3,556,739 | 1/1971 | Bendel et al. | 23/312 |
| 3,694,153 | 9/1972 | Williams et al. | 423/321 |
| 4,044,108 | 8/1977 | Kikuchi et al. | 423/321 |
| 4,207,307 | 6/1980 | Ishibashi et al. | 423/321 S |
| 4,209,497 | 6/1980 | Irami et al. | 423/315 |
| 4,233,278 | 11/1980 | Korchnak | 423/321 |
| 4,279,878 | 7/1981 | Maurer et al. | 423/321 R |

FOREIGN PATENT DOCUMENTS

| | | | |
|---|---|---|---|
| 27607 | 4/1981 | European Pat. Off. | 423/321 R |
| 2813755 | 10/1979 | Fed. Rep. of Germany | 423/321 R |
| 56-73608 | 6/1981 | Japan | 423/321 S |

*Primary Examiner*—Gregory A. Heller
*Attorney, Agent, or Firm*—Alexander J. McKillop; Michael G. Gilman; Stanislaus Aksman

[57] ABSTRACT

This invention provides a process for removal of residual organic matter from wet process phosphoric acid purified by solvent extraction with a volatile solvent that comprises contacting said purified phosphoric acid with hydrogen peroxide at a temperature between about 100° C. and about 150° C., for between ¼ hour and about 4 hours, and using a weight ratio of hydrogen peroxide to phosphoric acid between about 0.001 and about 0.05.

20 Claims, No Drawings

PROCESS FOR REMOVAL OF RESIDUAL ORGANIC MATTER FROM PURIFIED PHOSPHORIC ACID

CROSS-REFERENCE TO RELATED APPLICATION

This application is a continuation-in-part of copending U.S. Application Ser. No. 323,517, filed Nov. 23, 1981, now abandoned in the name of Richard G. Grotyohann, Byron E. Johnston and Robin Schlinger, the entire disclosure of which is expressly incorporated herein by reference.

BACKGROUND

This invention is concerned with the removal of residual organic matter from purified wet process phosphoric acid.

The Maurer et al U.S. Pat. No. 4,279,878, the entire disclosure of which is incorporated herein by reference, suggests that hydrogen peroxide has been used to attack chromophoric groups of organic impurities in phosphoric acid. However, this particular treatment was recognized as being insufficient to substantially remove organic impurities by oxidation of the organic impurities. (Note column 1, lines 29-44 and column 2, lines 52-63 of this Maurer et al patent.) Accordingly, the Maurer et al patent proposes a new process whereby phosphoric acid is heated in the presence of hydrogen peroxide and a catalyst to effect the oxidation of organic impurities. The use of a catalyst is essential, particularly in view of Example 3 (Comparative Example) on column 3, lines 26-32 of this Maurer et al patent. More particularly, this Comparative Example indicates that phosphoric acid, having a $P_2O_5$ content of 60% (i.e. more than about 82% $H_3PO_4$) which contains 440 ppm of organic carbon, still contains 290 ppm organic carbon after treatment with hydrogen peroxide in the absence of catalyst at a temperature of 80° C. for 1 hour. Even when a catalyst is used, 110 ppm is the smallest quantity of organic carbon detected after treatment with hydrogen peroxide in the Examples of the Maurer et al patent. It is noted that the organic contaminants oxidized by the process of the Maurer et al patent apparently include residual solvent. (Note column 3, lines 2-14 of the Maurer et al patent.)

The Kikuchi et al U.S. Pat. No. 4,044,108, the entire disclosure of which is incorporated herein by reference, describes a process for the removal of both coloring organic impurities and non-coloring organic impurities from phosphoric acid by an oxidation treatment. These non-coloring organic impurities are described as materials which become colored impurities when the phosphoric acid is heated to temperatures of greater than 200° C. for a sufficient time. (Note column 2, lines 17-30 of this Kikuchi et al patent.)

The process of the Kikuchi et al U.S. Pat. No. 4,044,108 involves the use of a very particular oxidizing agent, i.e. a chlorate, and a very particular phosphoric acid, i.e. greater than 90 wt. % $H_3PO_4$. Thus, according to Example 2 on column 7, lines 1-23 of this Kikuchi et al patent, 90.9% $H_3PO_4$ containing 590 ppm of carbon impurities was heated with 0.5 g of 35% HCl and 1.5 g of sodium chlorate at 110° C. for 1 hour to obtain a clear colorless phosphoric acid with only a trace amount of organic material. When this colorless phosphoric acid was heated to 280° C., no coloring was observed. However, when this same phosphoric acid was diluted with water to a concentration of 85% $H_3PO_4$ and subjected to the same treatment as Example 2, according to Reference Example 7 on column 7, lines 31-40 of this Kikuchi et al patent, the treated phosphoric acid contained 230 ppm of carbon and produced noticeable coloring upon heating to 280° C. Similarly, when 5.5 g of 30% $H_2O_2$ replaced the 1.5 g of sodium chlorate in the procedure of Example 2, according to Reference Example 8 on column 7, lines 41-54, noticeable coloring was also observed when this hydrogen peroxide treated phosphoric acid was heated to 280° C. Similar results with water dilution and hydrogen peroxide treatment, respectively, were obtained in Reference Examples 16 and 17 column 9, lines 13-38, of this Kikuchi et al patent.

It is noted that the particular phosphoric acid, which was subjected to treatment with an oxidizing agent in Example 2 and Reference Examples 8 and 17 of the Kikuchi patent, apparently contained organic impurities in the form of residual solvent. This conclusion is apparent from the fact that the 75.3% $H_3PO_4$ was contacted with the non-volatile solvent, tributyl phosphoric acid, and then was concentrated to 90.9% $H_3PO_4$ with total amount of carbon impurities increasing from 310 ppm to 590 ppm in the process.

SUMMARY

According to one aspect of the invention, there is provided a method for removal of residual organic matter from wet process phosphoric acid, said method comprising the steps of:

(i) extracting said wet process phosphoric acid with a volatile organic solvent;

(ii) removing essentially all of the residual volatile organic solvent from step (i) by distillation or steam stripping; and (iii) contacting the phosphoric acid from step (ii) with hydrogen peroxide at a temperature between about 100° C. and about 150° C., for between about ¼ hour and about 4 hours, and using a weight ratio of hydrogen peroxide to phosphoric acid between about 0.001 and about 0.05.

According to another aspect of the invention, there is provided a method as described above which takes place in the absence of catalyst to promote decomposition of hydrogen peroxide, and wherein the concentration of the phosphoric acid treated according to step (iii) is less than or equal to 90% by weight $H_3PO_4$, and whereby said hydrogen peroxide treated phosphoric acid is incapable of producing noticeable color when heated to a temperature of at least 200° C. under conditions sufficient to convert non-coloring organic impurities to coloring organic impurities.

According to another aspect of the invention, there is provided a method as described above which also takes place in the absence of catalyst to promote decomposition of hydrogen peroxide, and wherein the concentration of the phosphoric acid treated according to step (iii) is less than or equal to 80% by weight $H_3PO_4$ and the total organic level of the phosphoric acid immediately prior to hydrogen peroxide treatment is less than or equal to 200 mg of carbon per kg, and whereby the total organic level of the hydrogen peroxide treated phosphoric acid is reduced by at least about 50%.

DESCRIPTION OF SPECIFIC EMBODIMENTS

The phosphoric acid that is treated in the process of this invention is purified phosphoric acid, e.g., "food grade" phosphoric acid. This is derived from black wet process phosphoric acid. Generally, the black acid is separated from solids present and then purified by solvent extraction. Wet process phosphoric acid which has been purified by solvent extraction typically contains residual organic impurities. These impurities include organics present in the crude phosphoric acid and possibly residual solvent. If a volatile solvent is used the residual solvent can be removed by distillation or steam stripping. The residual organic matter derived from the crude phosphoric acid, on the other hand, has a low volatility and cannot readily be removed by distillation or steam stripping.

Examples of volatile solvents which can be used in accordance with the present invention include lower aliphatic alcohols (e.g., having 6 or less carbon atoms), ethers (e.g., having 8 or less carbon atoms) and ketones (e.g., having 8 or less carbon atoms). Particular examples of such solvents include isopropyl alcohol, methyl isobutyl ketone and diisopropyl ether.

In accordance with this invention, purified phosphoric acid is treated with hydrogen peroxide under specific reaction conditions to effect the desired reduction in organic impurity level. The hydrogen peroxide used has a concentration of 30-70% by weight in water. The weight ratio of $H_2O_2$ to phosphoric acid in the process feed will be between about 0.001 and about 0.05.

The phosphoric acid and hydrogen peroxide are contacted at a temperature between about 100° C. and about 150° C., preferably between 120° C. and about 135° C. The contact time will be between about ¼ hour and about 4 hours. The process can be carried out continuously to achieve fast and economic treatment. Treatments are carried out in an agitated reaction vessel.

The APHA (American Public Health Association) color scale measurement is described in the American Public Health Association publication, *Standard Methods for the Examination of Water and Sewage*, 14th Edition, p. 64. ASTM adopted this method as ASTM Designation D 1209 and indicates in their method that the methods are identical. ASTM refers to the color rating as a platinum-cobalt standard number, rather than APHA.

The solvent-free, extracted phosphoric acid to be treated with hydrogen peroxide in accordance with the present invention may initially contain, e.g., 400 or less mg of carbon per kg. Thus, for example, solvent-free, extracted phosphoric acids containing 200 or less mg of carbon per kilogram (e.g., from about 50 to about 200 mg/kg of carbon) may be contacted with hydrogen peroxide in accordance with the present invention.

The hydrogen peroxide treatment of the present invention may result in a reduction of the total organic level of the solvent-free, extracted phosphoric acid of at least 40%, preferably at least about 50%. The oxidized phosphoric acid may contain, e.g. 200 or less mg/kg of carbon, preferably 100 or less mg/kg of carbon, or even 50 or less mg/kg of carbon. By means of the present invention it is even possible to reduce the total organic level of the phosphoric acid from a point, whereby the unoxidized phosphoric acid would have a produced noticeable color when heated to a temperature of at least 200° C. under conditions sufficient to convert noncoloring organic impurities to coloring organic impurities, to a point, whereby such heating of the oxidized phosphoric acid would not produce such coloring.

The concentration of the phosphoric acid after volatile solvent extraction and steam stripping or distillation may be less than 90% by weight $H_3PO_4$, e.g., less than or equal to 80% by weight $H_3PO_4$, e.g., from 70 to 80% by weight $H_3PO_4$. The phosphoric acid may optionally be concentrated at any time after the solvent extraction step and prior to contact with hydrogen peroxide, e.g., before, during or after the steam stripping or distillation step.

The oxidation with hydrogen peroxide may take place in the absence of catalyst to promote decomposition of hydrogen peroxide. It will be understood that organic impurities removed by oxidation treatment with hydrogen peroxide essentially constitute entirely organics inherently present in the crude phosphoric acid. Essentially all of the residual solvent is removed by steam stripping or distillation.

EXAMPLE 1

A 50 ml portion of a purified 75% phosphoric acid was heated to 125° C. in an agitated round bottom flask. A 2.0 ml portion of 30% hydrogen peroxide was added and allowed to react at 125°–130° C. for 50 minutes. The total organic level (TOC) was reduced from 75 mg carbon/kg acid to 28 mg/kg.

EXAMPLE 2

A 50 ml portion of a purified 80% phosphoric acid was treated in a similar manner to Example 1. The TOC level was reduced from 95 mg/kg to 38 mg/kg.

EXAMPLE 3

A 150 g portion of a purified 75% phosphoric acid was mixed with aqueous hydrogen peroxide in a stirred flask at a $H_2O_2$/75% phosphoric acid weight ratio of 0.038/1. The reaction mixture was heated to 120° C. and held at 120°–127° C. for 45 minutes. The TOC was reduced from 117 mg/kg to 16 mg/kg.

EXAMPLE 4

A 50 g portion of a purified 80% phosphoric acid was mixed with aqueous hydrogen peroxide in a stirred flask at a $H_2O_2$/80% phosphoric acid ratio of 0.01/1. The reaction mixture was heated to 135° C. and held at this temperature for 30 minutes. The TOC was reduced from 213 mg/kg to 104 mg/kg.

EXAMPLE 5

A 75% purified phosphoric acid was treated with hydrogen peroxide in a continuous flow, agitated 5-liter reactor at 120° C. The average residence time for the phosphoric acid was 2.0 hours. The weight ratio of $H_2O_2$/75% phosphoric acid in the feed was 0.002. The TOC was reduced from 82 mg/kg to 17 mg/kg. The color of the acid was reduced from 25 APHA to less than 10 APHA.

EXAMPLE 6

A 70% purified phosphoric acid was treated with hydrogen peroxide in a manner similar to Example 5. The TOC was reduced from 92 mg/kg to 40 mg/kg. The color was reduced from 140 APHA to 15 APHA.

Although the present invention has been described with preferred embodiments, it is to be understood that modifications and variations may be resorted to, without departing from the spirit and scope of this invention, as those skilled in the art will readily understand. Such modifications and variations are considered to be within the purview and scope of the appended claims.

What is claimed is:

1. A method for removal of residual organic matter from wet process phosphoric acid, said method comprising the steps of:
   (i) extracting said wet process phosphoric acid with a volatile organic solvent;
   (ii) removing essentially all of the residual volatile organic solvent from step (i) by distillation or steam stripping; and
   (iii) contacting the phosphoric acid from step (ii) with hydrogen peroxide at a temperature between about 100° C. and about 150° C., for between about $\frac{1}{4}$ hour and about 4 hours, and using a weight ratio of hydrogen peroxide to phosphoric acid between about 0.001 and about 0.05.

2. The method of claim 1, wherein said temperature is at least about 120° C.

3. The method of claim 1, wherein said temperature is between about 120° C. and about 135° C.

4. The method of claim 1, wherein said hydrogen peroxide treated phosphoric acid is incapable of producing noticeable color when heated to a temperature of at least 200° C. under conditions sufficient to convert non-coloring organic impurities to coloring organic impurities.

5. The method of claim 1, wherein the total organic level of the hydrogen peroxide treated phosphoric acid is less than or equal to 200 mg of carbon per kg.

6. The method of claim 1, wherein the total organic level of the hydrogen peroxide treated phosphoric acid is less than or equal to 100 mg of carbon per kg.

7. The method of claim 1, wherein the total organic level of the hydrogen peroxide treated phosphoric acid is less than or equal to 50 mg of carbon per kg.

8. The method of claim 1, wherein the total organic level of the hydrogen peroxide treated phosphoric acid is reduced by at least 40%.

9. The method of claim 1, wherein the total organic level of the hydrogen peroxide treated phosphoric acid is reduced by at least about 50%.

10. The method of claim 1, wherein said volatile solvent is selected from the group consisting of lower aliphatic alcohols, lower aliphatic ethers and lower aliphatic ketones.

11. The method of claim 10, wherein said volatile solvent is selected from the group consisting of isopropanol, diisopropyl ether and methyl isobutyl ketone.

12. The method of claim 1, wherein the total organic level of the phosphoric acid immediately prior to treatment with hydrogen peroxide is equal to or less than 400 mg of carbon per kg.

13. The method of claim 1, wherein the total organic level of the phosphoric acid immediately prior to treatment with hydrogen peroxide is equal to or less than 200 mg of carbon per kg.

14. The method of claim 1, wherein the total organic level of the phosphoric acid immediately prior to treatment with hydrogen peroxide is from about 50 to about 200 mg of carbon per kg.

15. The method of claim 1, wherein the concentration of said phosphoric acid treated according to step (iii) is less than 90% by weight $H_3PO_4$.

16. The method of claim 1, wherein the concentration of said phosphoric acid treated according to step (iii) is less than or equal to 80% by weight $H_3PO_4$.

17. The method of claim 1, wherein the concentration of said phosphoric acid treated according to step (iii) is from 70 to 80% by weight $H_3PO_4$.

18. The method of claim 1, which takes place in the absence of catalyst to promote decomposition of hydrogen peroxide.

19. A method for removal of residual organic matter from wet process phosphoric acid, said method comprising the steps of:
   (i) extracting said wet process phosphoric acid with a volatile organic solvent;
   (ii) removing essentially all of the residual organic solvent from phosphoric acid of step (i) by distillation or steam stripping; and
   (iii) contacting the phosphoric acid from step (ii) with hydrogen peroxide in the absence of catalyst to promote decomposition of hydrogen peroxide, at a temperature between about 120° C. and about 150° C., for between about $\frac{1}{4}$ hour and about 4 hours, and using a weight ratio of hydrogen peroxide to phosphoric acid between about 0.001 and about 0.05, wherein the concentration of the phosphoric acid treated according to step (iii) is less than or equal to 90% by weight $H_3PO_4$, and whereby said hydrogen peroxide treated phosphoric acid is incapable of producing noticeable color when heated to a temperature of at least 200° C. under conditions sufficient to convert non-coloring organic impurities to coloring organic impurities.

20. A method for removal of residual organic matter from wet process phosphoric acid, said method comprising the steps of:
   (i) extracting said wet process phosphoric acid with a volatile organic solvent;
   (ii) removing essentially all of the residual organic solvent from phosphoric acid of step (i) by distillation or steam stripping; and
   (iii) contacting the phosphoric acid from step (ii) with hydrogen peroxide in the absence of catalyst to promote decomposition of hydrogen peroxide, at a temperature between about 120° C. and about 150° C., for between about $\frac{1}{4}$ hour and about 4 hours, and using a weight ratio of hydrogen peroxide to phosphoric acid between about 0.001 and about 0.05, wherein the concentration of the phosphoric acid treated according to step (iii) is less than or equal to 80% by weight $H_3PO_4$ and the total organic level of the phosphoric acid immediately prior to hydrogen peroxide treatment is less than or equal to 200 mg of carbon per kg, and whereby the total organic level of the hydrogen peroxide treated phosphoric acid is reduced by at least about 50%.

* * * * *